Dec. 16, 1930.   H. DOLAN   1,785,113
WINDSHIELD WIPER
Filed Nov. 2, 1928
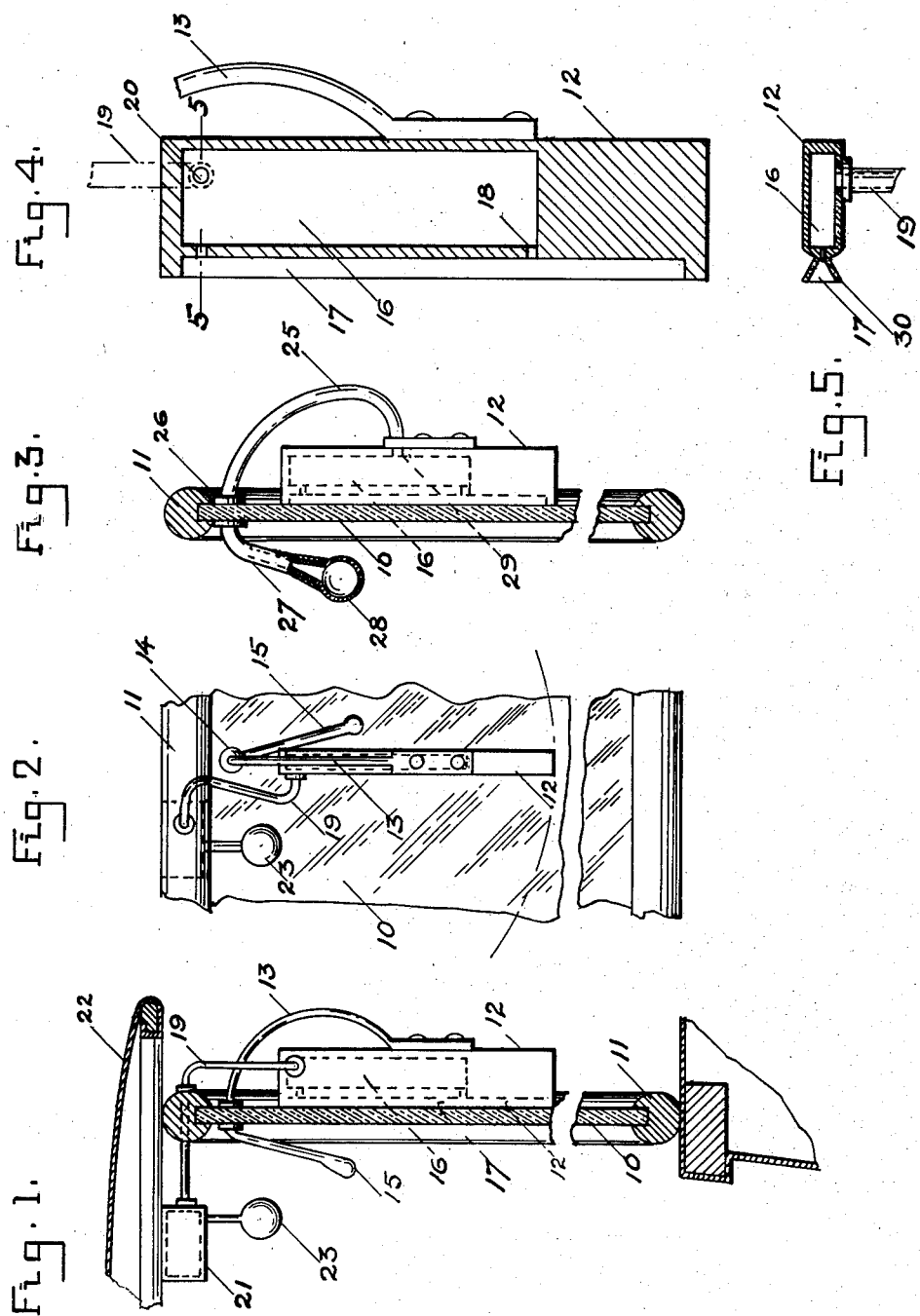

Patented Dec. 16, 1930

1,785,113

UNITED STATES PATENT OFFICE

HUGH DOLAN, OF POTTSVILLE, PENNSYLVANIA

WINDSHIELD WIPER

Application filed November 2, 1928. Serial No. 316,862.

My invention relates to a device adapted to prevent water from freezing on a wind-shield, or the like, and to remove snow, sleet and ice when collecting on the shield.

This object of the invention is carried out by providing a movable wind-shield wiper or scraper with a receptacle for holding a certain quantity of a compound or solution that has anti-freezing properties, which compound is forced out either by gravity or by mechanical means from said receptacle and spread over the surface of the wind-shield, while the wiper sweeps back and forth over the same.

In order to force the compound out of the chamber any suitable means may be employed, such as a hand compressor, a pump, or the exhaust gases from the motor. A very simple and effective compressor consisting of a rubber bulb is, however, illustrated on the drawing as the preferred form. In some cases a gravity tank may be employed in place of a compressor for continuous flow of the non-freezing compound.

In this manner, if for instance an oscillating wiper is used, the area swept by the scraper or wiper blade will thus be free from accumulation, not only of water, but also of ice, sleet and snow, so that as a consequence a free vision can be had from the driver's position in an automobile or by a pilot in an airplane or dirigible balloon.

In devices of this character formerly in use, a spray of warm water was generally directed against the wind-shield to melt snow and ice. This spray usually struck the shield near the top edge thereof and was permitted to flow down its surface without guidance whatsoever, so that it is very questionable whether it would actually be efficient in melting ice.

In other instances hot air devices have been used for the same purpose, generally somewhat like a flat iron, which is intermittently pushed along the surface of the glass without touching it. In neither case is there any cooperation between the wind-shield wiper and the spraying. In applicant's device, on the other hand, the spraying and scraping are made to take place simultaneously and along the entire length of the wiper blade.

In the accompanying drawing, wherein like reference characters indicate corresponding parts throughout the several views, Figure 1 is a fragmentary vertical section of a wind-shield for a motor vehicle showing the wiper in position thereon and furnished with a spraying appliance for non-freezing compound or solution;

Figure 2 is a fragmentary front elevation of Figure 1;

Figure 3 a view similar to Figure 1 showing a modified form of the device;

Figure 4 is a vertical section of the wiper in larger scale; and

Figure 5 a cross-section along line 5—5 of Figure 4.

Referring first to Figures 1, 2, 4 and 5, reference numeral 10 represents the wind-shield glass carried in its frame 11, as usual. The scraper or wiper blade 12 constructed in the form of a block is in the usual manner suspended on an arm 13 adapted to swing from an opening as at 14 in the wind shield. The wiper blade is oscillated in any suitable manner either manually as by a handle 15 or by electric motor, or through the vacuum tank, in the usual way.

The wiper blade is hollow (see Figures 4 and 5) to provide a narrow chamber 16, for non-freezing compound or solution. A longitudinal groove 17 is provided in the scraping edge of the blade, preferably terminating short of each end thereof, but this groove may, if desired, also open at the top and bottom ends. At 18 are shown narrow apertures connecting the chamber 16 with the groove 17.

A tube 19 of flexible material such as an armoured cable is attached to the upper end of the blade 12 and opening at 20 into the chamber 16. This tube is drawn rearwardly through the wind-shield and connects with a small closed tank or reservoir 21 also filled with non-freezing compound. This tank may be secured under the top 22 of the automobile or to the wind-shield itself. Enough slack should be allowed in the tube to permit the full swing of the wiper blade. If the non-freezing compound is sufficiently thin, the reservoir 21 may serve as gravity tank to pass the said compound through the tube 19 into the chamber 16 of the wiper blade 12 and through the apertures 18 into the groove 17. As the blade 12 then swings back and forth actuated by the handle 15 or by mechanical or other means, the compound will then be spread over the surface of the wind-shield glass 10 and start to dissolve ice, sleet, or snow collected thereon. A sufficiently large space will then rapidly be cleared by the wiper to permit a clear vision through the wind-shield.

If, however, gravity action is found not to be sufficient to force the compound through said conduits and on to the surface of the wind-shield, a bulb 23 may be supplied on the tank 21 for compressing the compound, when said bulb is squeezed, and force the compound through said conduits. The bulb should be placed adjacent the operating handle or attached to the same so that they may be worked together by one hand.

In Figure 3 of the drawing the device is a modified simple form. As before the wiper blade 12 is made hollow providing a chamber 16 with apertures 18 leading into the face or edge groove 17. The blade is mounted to swing on an arm 25 which is adapted to turn in a bearing formed at 26 in the wind-shield. The arm 25 is tubular and terminates with a handle 27 on the rear side of the shield and to the open end thereof is attached a rubber bulb 28.

The handle 27 and the arm 25 thus comprise a conduit through which compressed air may pass into the chamber 16 of the wiper blade through the aperture 29 whenever the bulb 28 is squeezed together by hand. As the non-freezing compound becomes more and more compressed, it must now escape through the small apertures 18 into the groove 17 and spread over the surface of the wind-shield glass as the wiper is swung from side to side.

Referring to Figure 5 of the drawing, it will be noted that a sharp edge 30 is formed along the sides of the groove 17 at the operating face of the wiper blade 12. When now the blade sweeps over a certain area of the wind shield glass, the ice, softened by the compound or under process of dissolving, will be easily removed by the knife edges 30 and thus quickly a semi-circular space, clear from ice or water will be obtained on the glass.

It will be evident that this invention is applicable equally as well to wipers that are operated to travel in straight lines across the shield, as to oscillating ones described above and that its use is not limited to wind-shields but may be applied to window pane cleaners in general.

It is also to be understood that the invention is not limited to the details of construction here shown and described, but that these may be varied widely without departing from the spirit of the invention as defined by the claim.

What I claim as new is:

A wind-shield wiper comprising a block member provided with a solution holding chamber and a communicating open groove formed in and extending along one edge thereof, said groove adapted to lie in contact with the surface of the wind-shield, the block portions immediately adjacent said groove and for the full length thereof constructed with oppositely disposed knife-edges for the purpose set forth.

In witness whereof, I have hereunto set my hand at Pottsville, Pennsylvania, this 20th day of October, A. D. nineteen hundred and twenty-eight.

HUGH DOLAN.